United States Patent
Chiba

(10) Patent No.: US 7,952,749 B2
(45) Date of Patent: May 31, 2011

(54) INFORMATION PROCESSING APPARATUS, INFORMATION PROCESSING METHOD, AND PRINTING SYSTEM

(75) Inventor: Kazumi Chiba, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 784 days.

(21) Appl. No.: 12/027,471

(22) Filed: Feb. 7, 2008

(65) Prior Publication Data

US 2008/0204819 A1    Aug. 28, 2008

(30) Foreign Application Priority Data

Feb. 28, 2007  (JP) ................. 2007-049369

(51) Int. Cl.
G06F 15/00 (2006.01)
H04N 1/393 (2006.01)
G06K 9/32 (2006.01)
(52) U.S. Cl. ............ 358/1.2; 358/451; 382/298
(58) Field of Classification Search .......... 358/1.2, 358/1.9, 2.1, 1.18, 451; 382/293, 298
See application file for complete search history.

(56) References Cited

U.S. PATENT DOCUMENTS

| 5,019,724 A * | 5/1991 | McClure ............... 326/29 |
| 6,313,902 B1 * | 11/2001 | Enomoto ............... 355/18 |
| 6,580,521 B1 * | 6/2003 | Nishikawa et al. ........ 358/1.18 |
| 6,600,548 B2 * | 7/2003 | Enomoto ............... 355/40 |
| 6,834,127 B1 * | 12/2004 | Yamamoto ............ 382/282 |
| 6,922,260 B2 * | 7/2005 | Nishikawa et al. ........ 358/1.18 |
| 7,379,978 B2 * | 5/2008 | Anderson et al. ......... 709/219 |
| 7,624,359 B2 * | 11/2009 | Naito .................... 715/864 |
| 7,821,690 B2 * | 10/2010 | Yamada et al. .......... 358/527 |
| 7,859,707 B2 * | 12/2010 | Kuwano et al. ........ 358/1.18 |
| 2002/0030797 A1 * | 3/2002 | Enomoto ............... 355/18 |
| 2002/0085831 A1 * | 7/2002 | Mishima et al. ........... 386/68 |
| 2005/0157344 A1 * | 7/2005 | Nagashima ............ 358/1.18 |
| 2008/0291497 A1 * | 11/2008 | Kuwano et al. ........ 358/1.18 |

FOREIGN PATENT DOCUMENTS

| JP | 2005-301883 A | 10/2005 |
| JP | 2006-231676 A | 9/2006 |

* cited by examiner

*Primary Examiner* — Jerome Grant, III
(74) *Attorney, Agent, or Firm* — Canon U.S.A., Inc., IP Division

(57) ABSTRACT

An apparatus capable processing form data including a variable region acquires image data to be inserted into the variable region of the form data. The apparatus calculates a scaling rate between the acquired image data prior to being scaled for insertion into the variable region and corresponding image data that has been scaled for insertion into the variable region. The apparatus determines image data to be check-printed based on the calculated scaling rate and generates print data for check-printing the image data to be check-printed in a condition in which the image data to be check-printed has been scaled for insertion into the variable region.

19 Claims, 16 Drawing Sheets

FIG.11

```
<List>
<THRESHOLD VALUE>50%</THRESHOLD VALUE>
<STEPSIZE>10%</STEPSIZE>
  <File>
<Level>Level1</Level>
<File_Name>File1</File_Name>
    <Pixel_Size>720*720</Pixel_Size>
    <Rate>49.4</Rate>
    <Link>X:¥Sample_image¥ScanData¥</Link>
  </File>
  <File>
<Level>Level1</Level>
<File_Name>File5</File_Name>
    <Pixel_Size>700*700</Pixel_Size>
    <Rate>46.7</Rate>
    <Link>X:¥Sample_image¥Digital Camera¥</Link>
  </File>
      .
      .
      .
```

FIG.12

THRESHOLD VALUE  50%
STEPSIZE  10%

| Level | File_Name | Pixel_Size | rate [%] | Link |
|---|---|---|---|---|
| Level1 | File1 | 720*720 | 49.4 | X:¥Sample_image¥ScanData¥ |
| Level1 | File5 | 700*700 | 46.7 | X:¥Sample_image¥DigitalCamera¥ |
| ... | ... | | | |
| Level4 | File24 | 420*420 | 16.8 | X:¥Sample_image¥ScanData¥ |
| Level4 | File3 | 400*400 | 15.2 | X:¥Sample_image¥Download_Data¥ |
| Level4 | File7 | 250*250 | 6.0 | X:¥Sample_image¥Download_Data¥ |
| Level5 | File4 | 220*220 | 4.6 | X:¥Sample_image¥Download_Data¥ |
| Level5 | File21 | | | |

INFORMATION PROCESSING APPARATUS, INFORMATION PROCESSING METHOD, AND PRINTING SYSTEM

BACKGROUND OF THE INVENTION

1. Field of the Invention

The present invention relates to a method for generating print data for check-printing image data to be inserted into a variable region of form data in a printer and confirming an image to be used in variable data printing by outputting the image and an information processing system capable of modifying an image database in variable data printing.

2. Description of the Related Art

In recent years, a market for Print On Demand (POD) has developed accordingly as image forming apparatuses, such as electrophotographic printing apparatuses or an inkjet printing apparatuses, have achieved higher processing speed and image quality. In the POD market, a job of a relatively small lot can be processed as a digital print using electronic data and be quickly delivered to a customer, without the use of a large-scale image forming apparatus. In comparison to the conventional print industry, the POD market integrates digital technology by using a computer in managing and controlling printing. Consequently, the POD market is coming closer to the conventional printing industry in performance level. The POD market includes various services, such as Print for Pay (PFP), which is a print service provided by copy shops and print shops, and Centralized Reproduction Department (CRD), which is an in-house print service.

Moreover, there is a technique referred to as Variable Data Printing (VDP), which is derived from POD and which exploits a characteristic of a digital image forming apparatus. In VDP, content to be printed can be changed according to information in a database for each printing. For example, VDP can be used in printing direct mail, in which product information to be supplied to a customer can be changed according to customer information. Furthermore, VDP can be used in generating an account statement, such as an energy bill, in which the numerals can be changed according to the usage of energy.

Print data in a VDP system is referred to as VDP data. An application that generates VDP data is referred to as a VDP application. The VDP application provides a user interface for a user to create a page layout. In a general print layout application, a user disposes actual objects, such as text or images, on a user interface. However, in a VDP application, since such objects may change according to information in a database, a user determines a region in which an object is to be disposed, i.e., the location and size of the region and the type of content (e.g., text, image, or graphics) to be disposed in the region. In particular, a region in which content can change according to a record in a database is referred to as a "variable region", and a region in which content does not change according to a record in a database is referred to as a "fixed region".

In a variable region, a user sets a conditional expression using each data column in a database, so that the content of the region changes according to a record in the database. For example, a conditional expression can be set such that if the value of "age" in a record of a database is between 20 to 29, a photographic image that suits younger adults is disposed in the variable region, and if the value is greater than or equal to 60, a photographic image that suits the elderly is disposed in the variable region.

As described above, a VDP application generates VDP data that associates a region in a page with a database and sends the VDP data to a digital image forming apparatus. Upon receiving the VDP data, the digital image forming apparatus prints the VDP data according to the association described in the VDP data.

In a VDP application, a print content (e.g., text, image, or graphics) changes according to each record value in a database. Therefore, it is difficult to confirm whether all records are correctly printed if the database includes a large number of records.

In particular, image data for use in VDP is often obtained by various methods and devices, such as an image downloaded from the Internet, an image scanned by a scanner, or an image photographed by a digital camera. As a result, there is a variation in the pixel size, which can cause a problem. For example, the first image data may be printed with an appropriate quality while the second image data of a low resolution may be printed at an unacceptable print quality. A reliable way to confirm a print quality of the above-described image data to be used in VDP is to actually print the image data. However, it may not be realistic to print all VDP data when there are a large number of records. Moreover, in the case of printing VDP data, even when a user desires to extract and check only image data, other form data and text data are printed together with the image data. Consequently, a large amount of printing medium and toner is necessary for printing for checking the image data. Further, as image data to be used in performing VDP increases, the time required for a user and the cost for printing to check the print quality increase.

To solve the above-described problems, Japanese Patent Application Laid-Open No. 2005-301883 discusses a technique for analyzing print data when printing the print data. If it is determined that an appropriate printing cannot be performed based on a result of the analysis, the analysis information and the corresponding detailed information are displayed to inform a user why a printing result is coarse.

Furthermore, Japanese Patent Application Laid-Open No. 2006-231676 discusses a technique that includes a first image synthesis mode and a second image synthesis mode. A normal variable data printing is performed in the first image synthesis mode, and all variable information and master data are synthesized to be output as one image in the second image synthesis mode. Consequently, a user can easily confirm all images that are output by variable data printing.

However, the technique discussed in Japanese Patent Application Laid-Open No. 2005-301883 does not allow a user to obtain information on a result of printing image data after a plurality of image data is each converted by the VDP application, which is a typical process in a variable data printing. Furthermore, the user cannot sufficiently confirm whether a desired printing result can be obtained for all image data to be used in variable data printing.

The technique discussed in Japanese Patent Application Laid-Open No. 2006-231676 allows a user to determine whether the image data to be used in variable data printing will be laid out appropriately when the image data is synthesized. However, an improved method is desired for confirming whether the image data to be used in variable data printing is an image that is suitable for actual printing.

SUMMARY OF THE INVENTION

An embodiment of the present invention is directed to a printing system capable of allowing a user to confirm a print quality of variable data, which is to be obtained when the variable data is actually printed, before printing the variable data with a printer, in consideration of a resolution of image data used for variable data.

According to an aspect of the present invention, an information processing apparatus for generating print data for check-printing image data to be inserted into a variable region of form data in a printer comprises an acquisition unit configured to acquire image data to be inserted into the variable region of the form data, a calculation unit configured to calculate a scaling rate between the image data acquired by the acquisition unit prior to being scaled for insertion into the variable region and corresponding image data after being scaled for insertion into the variable region, a generation unit configured to determine image data to be check-printed based on the scaling rate calculated by the calculation unit and to generate print data for check-printing the image data to be check-printed in a condition in which the image data to be check-printed has been scaled for insertion into the variable region, and a sending unit configured to send the print data generated by the generation unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 11 illustrates content of an Extensible Markup Language (XML) file in which a list is stored in XML format according to an exemplary embodiment of the present invention FIG. 12 illustrates a list that is generated from the XML file illustrated in FIG. 11 using an XML Stylesheet Language Transformation (XSLT) according to an exemplary embodiment of the present invention.

DETAILED DESCRIPTION OF THE EMBODIMENTS

Various exemplary embodiments, features, and aspects of the invention will be described in detail below with reference to the drawings.

Figure 1:
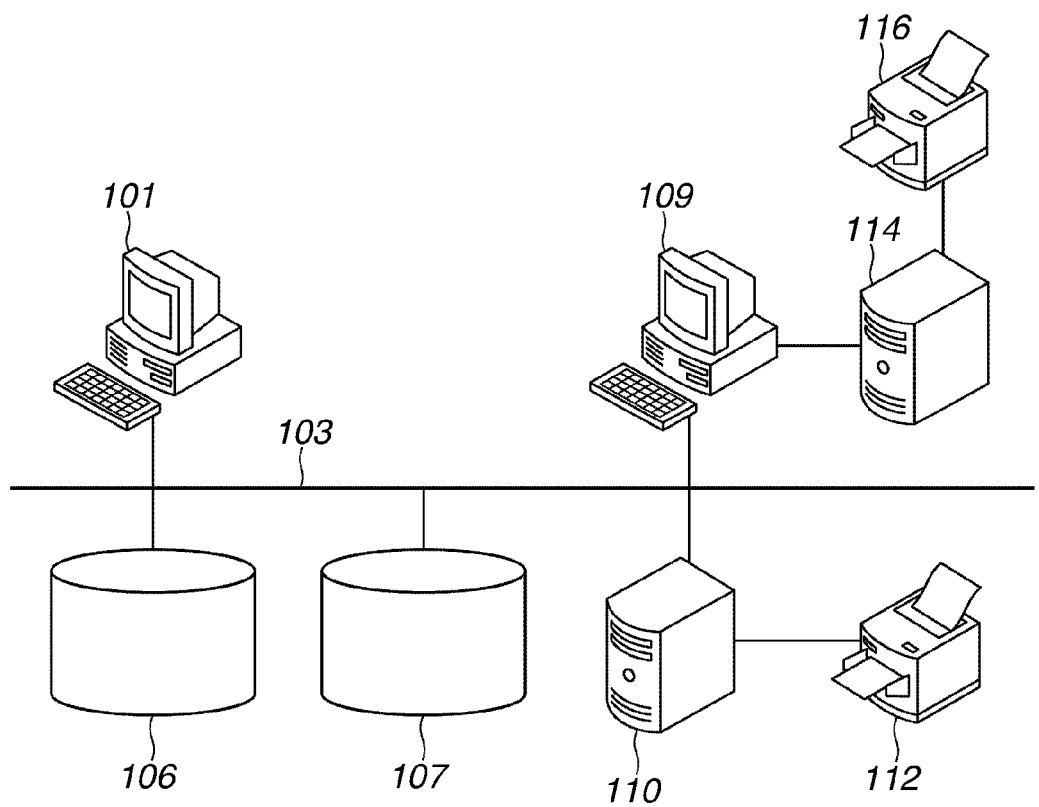
FIG. 1 is an example of a configuration of a VDP system according to an exemplary embodiment of the present invention.

FIG. 1 illustrates an example of a configuration of a VDP system according to an exemplary embodiment of the present invention. In the present embodiment, a VDP system includes a host computer 101 that executes a VDP application for generating or editing a form or layout of VDP data, and a VDP data check computer 109 that checks VDP data. The VDP system further includes a database server 106 that stores image data to be used as VDP data, and a file server 107 that stores VDP data to be printed. Print servers 110 and 114 receive print data from the host computer 101 or the VDP data check computer 109, send the received data to a printer 112 or 116, and control a printing process. In particular, the printer 116 in the present embodiment is used to perform check printing for checking a print result of VDP data or a resolution of image data. The host computer 101, the database server 106, the file server 107, the VDP data check computer 109, the print servers 110 and 114, and the printers 112 and 116 are connected via a network 103 to be communicable with each other.

In an exemplary embodiment, two information processing apparatuses (i.e., personal computers (PCs)) are used to generate and check VDP data. However, the processes can be performed by one PC. Moreover, image data can be managed by a PC instead of an external database server or a file server. Furthermore, a PC can directly send print data for printing VDP data to the printer instead of the print server. Furthermore, one printer can perform the check printing and actual printing. Moreover, the present invention is applicable to any printer that includes a printing function, for example, a copying machine or a multifunctional peripheral.

Figure 15:
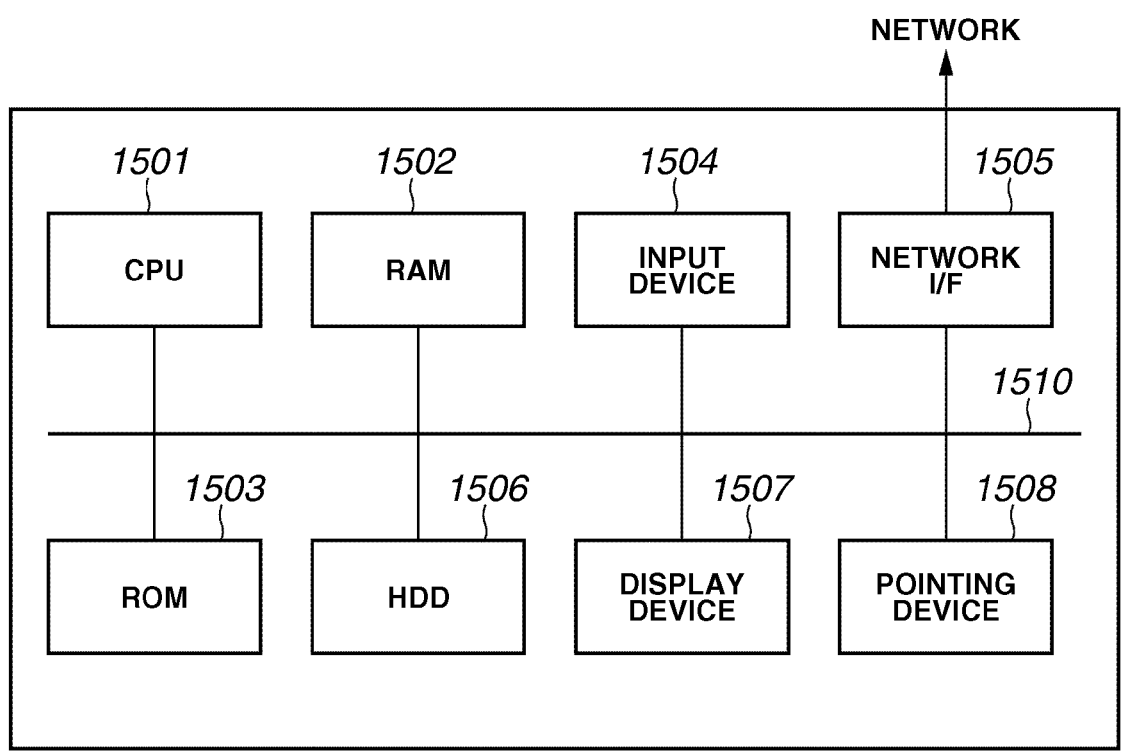
FIG. 15 is a block diagram illustrating a hardware configuration of a personal computer (PC), such as a host computer, a VDP data check computer, or a print server, illustrated in FIG. 1 according to an exemplary embodiment of the present invention.

FIG. 15 is a block diagram illustrating a hardware configuration of an information processing apparatus, such as the host computer 101, the VDP data check computer 109, or the print server 110 or 114.

Referring to FIG. 15, a central processing unit (CPU) 1501, a random access memory (RAM) 1502, a read-only memory (ROM) 1503, an input device 1504, such as a keyboard, a network interface (I/F) 1505, and a hard disk drive (HDD) 1506 are connected via a system bus 1510 to be communicable with each other. Further, a display device 1507, such as a cathode-ray tube (CRT), and a pointing device 1508, such as a mouse, are connected via the system bus 1510 to be communicable with each other. The ROM 1503 or the HDD 1506 stores a control program. The CPU 1501 reads the control program into the RAM 1502 and executes the control program to realize the function of a computer. Moreover, the CPU 1501 displays various types of information with the display device 1507 and receives a user instruction through via input device 1504 or the pointing device 1508. Further, the CPU 1501 communicates with other devices on a network, such as a local area network (LAN), via the network I/F 1505.

Figure 16:
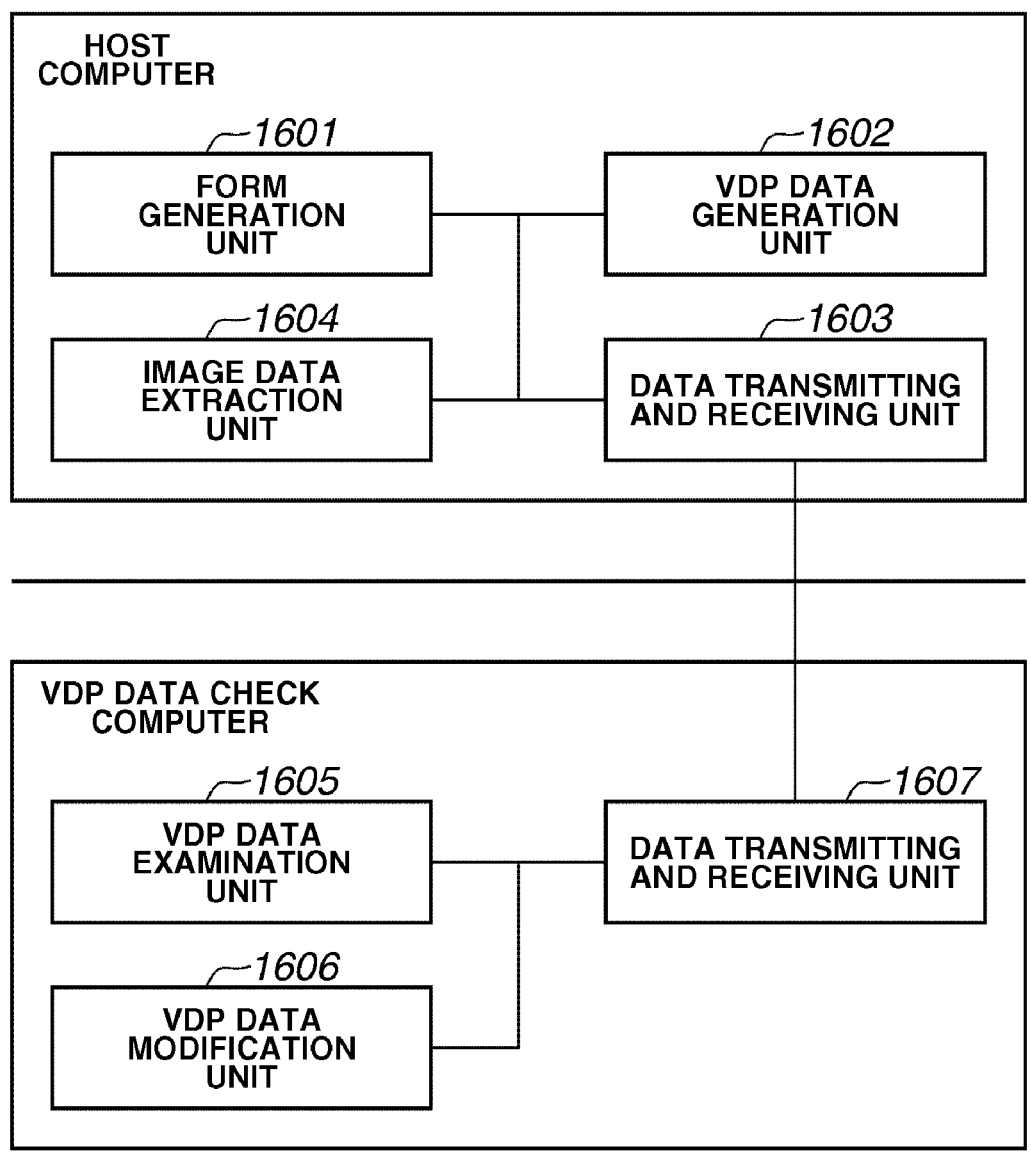
FIG. 16 illustrates a configuration of a software module in a host computer and a VDP data check computer according to an exemplary embodiment of the present invention.

FIG. 16 illustrates a configuration of a software module in the host computer 101 and the VDP data check computer 109.

The host computer 101 includes a form generation unit 1601 that generates a form to be used in VDP data, and a VDP data generation unit 1602 that generates and edits VDP data based on a generated form. A data transmitting and receiving unit 1603 transmits and receives VDP data to and from the VDP data check computer 109, the file server 107, or the print server 110 or 114, and transmits and receives image data to and from the database server 106. An image data extraction unit 1604 acquires imaged data from the database server 106 via the data transmitting and receiving unit 1603 and manages the image data.

The VDP data check computer 109 includes a VDP data examination unit 1605 that performs checking VDP data and a VDP data modification unit 1606 that edits and modifies VDP data or image data. The VDP data check computer 109 further includes a data transmitting and receiving unit 1607 that transmits and receives VDP data and image data to and from an external device.

Figure 2:
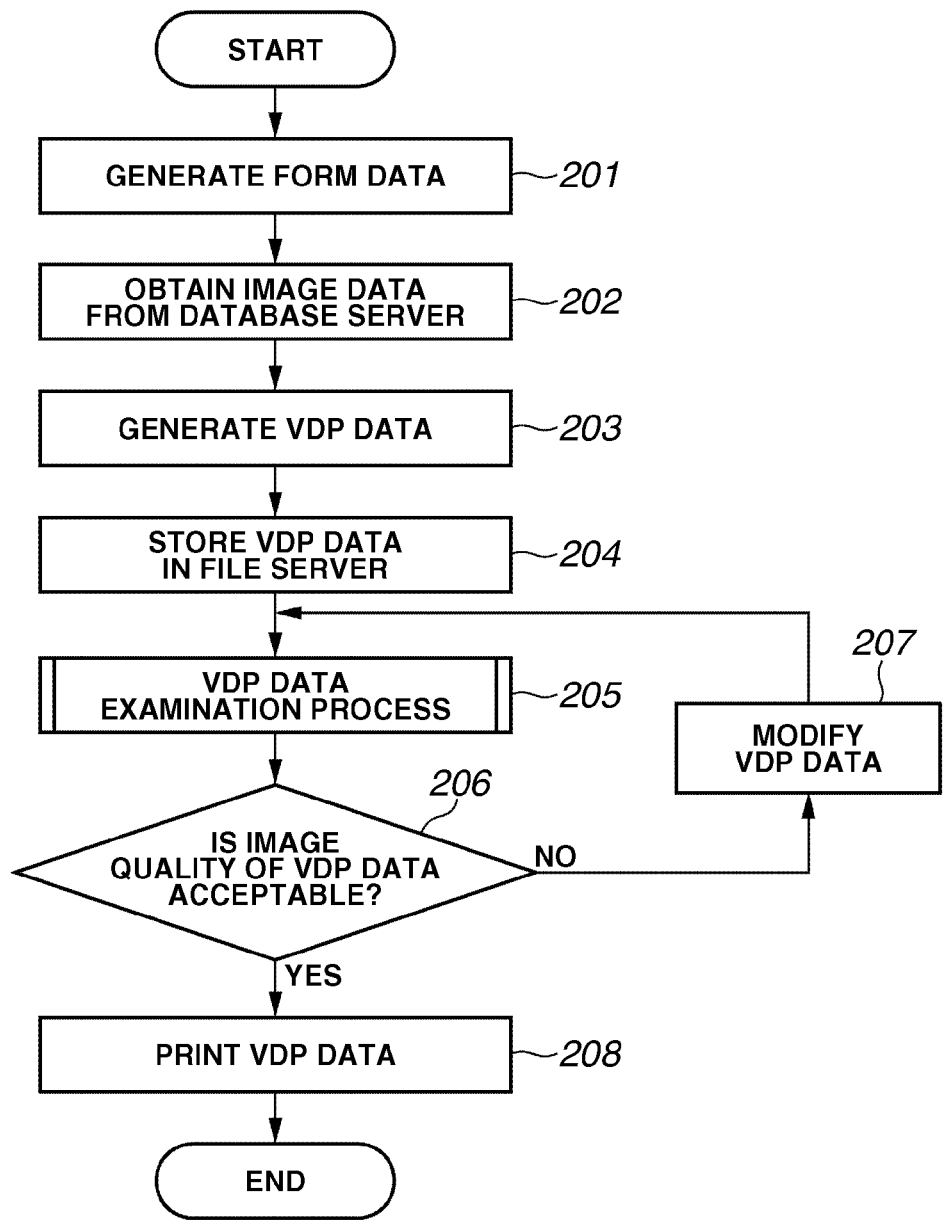
FIG. 2 is a flowchart illustrating a process leading to printing of VDP data, in which variable data printing is performed using the VDP system illustrated in FIG. 1 according to an exemplary embodiment of the present invention.

FIG. 2 is a flowchart illustrating a process leading to printing of VDP data using the VDP system illustrated in FIG. 1 according to an exemplary embodiment of the present invention.

In step 201, the form generation unit 1601 generates form data. A user can use any form design tool to generate a form as long as the tool outputs a file of a format that corresponds to an application that processes VDP data in the present exemplary embodiment. In step 202, the image data extraction unit 1604 acquires image data from the database server 106. In step 203, the VDP data generation unit 1602 assigns a data source to each insertion field (variable region) in the form data generated in step 201. The VDP data generation unit 1602 then inserts the image data obtained in step 202 into each insertion field to generate VDP data. The database server 106 includes various image data obtained by various methods, such as an image downloaded from the Internet, an image scanned by a scanner, or an image photographed by a user using a digital camera. Therefore, when image data is obtained from the image server 106 in step 202, the image server 106 includes various image data that may vary in pixel size, storage format of an image, or degree of degradation.

In step 204, the data transmitting and receiving unit 1603 stores the VDP data generated in step 203 into the file server 107 via the network 103. At this time, the image data previously obtained by the image data extraction unit 1604 is stored together with the VDP data in the file server 107. Simultaneously, the image data stored together with the VDP data in the file server 107 is associated with the original image data stored in the database server 106. The data can be associated by assigning an identification number (ID) to each image data.

In step 205, the VDP data examination unit 1605 in the VDP data check computer 109 examines the VDP data and obtains a quality confirmation result on the examination from a user. In step 206, the VDP data examination unit 1605 determines whether the quality of the VDP data (or image data to be examined in the database server 106 to be described below) is approved by the user, based on the result obtained from the user. If it is determined that the quality is not approved (NO in step 206), the process proceeds to step 207. On the other hand, if it is determined that the quality is approved (YES in step 206), the process proceeds to step 208. In step 207, the VDP data modification unit 1606 modifies the VDP data or the image data. The VDP data check computer 109 then sends via the print server 114 print data of the VDP data to the printer 116 for check printing. As a result, printing, such as check printing of image data or test printing of VDP data, can be performed to examine the VDP data. In the present exemplary embodiment, after the VDP data or the image data is modified in step 207 according to a user instruction, the process returns to step 205 to examine the VDP data again. Further, the VDP data can be printed directly after examination without modifying the VDP data or the image data.

In step 208, the data transmitting and receiving unit 1607 sends the VDP data that has been examined and modified in steps 205 and 207 to the print server 110. Since the print server 110 is connected to the printer 112 via a network, the print server 110 causes the printer 112 to print and output VDP data received from an external PC.

As described above, according to the present exemplary embodiment, the VDP system generates VDP data. Further, the VDP system performs an examination of the VDP data before actually printing the VDP data, by printing image data to be used in the VDP data on the printer 116 that is used for check printing.

A VDP data generation process performed in step 203 of the flowchart illustrated in FIG. 2 will be described in detail below. A VDP application in the present exemplary embodiment can be any application as long as the application includes the VDP data generation unit 1602. Further, a VDP application can include various functions or user interface (UI), and the VDP application described below is an example of such a VDP application.

Figure 3:
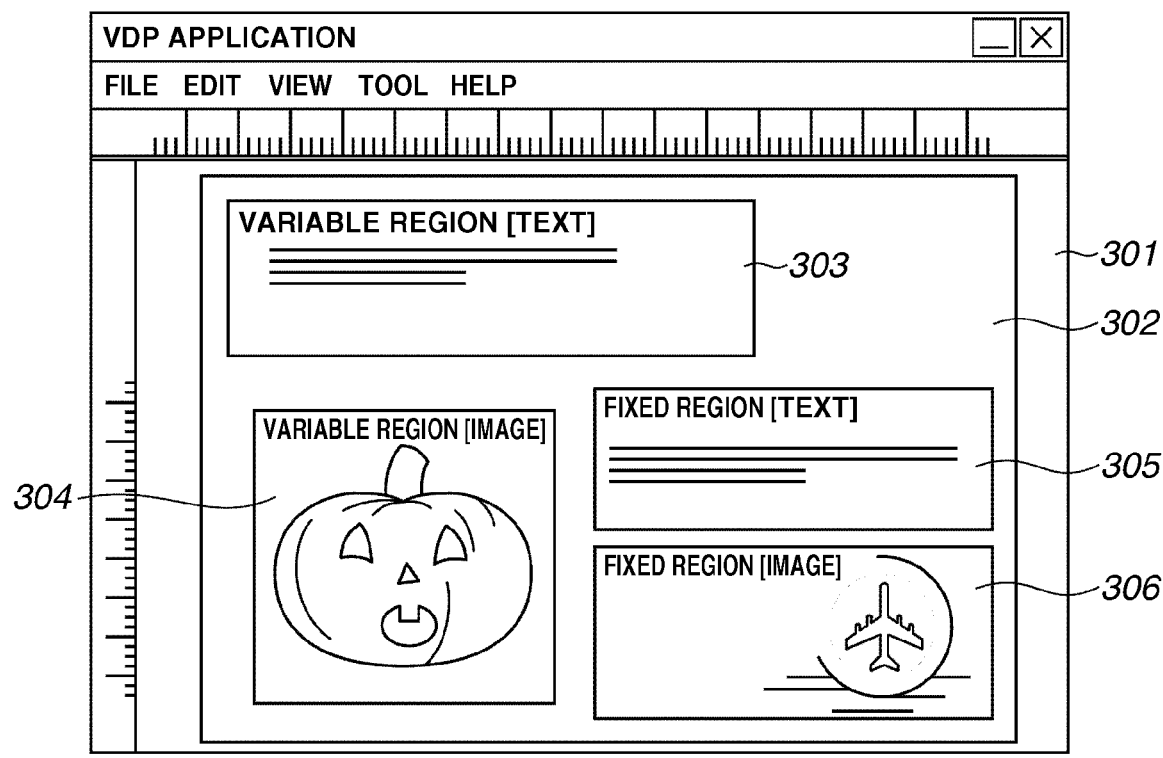
FIG. 3 illustrates an example of a user interface (UI) screen displayed by a VDP data generation unit when a user edits VDP data.

FIG. 3 illustrates a UI screen that the VDP data generation unit 1602 displays when a user edits VDP data. In the UI screen for editing VDP data, there is a document area 302 that indicates a boundary of a document on an editing area 301. A user disposes an object on the document area 302 and generates VDP data.

Referring to FIG. 3, four objects are disposed on the document area 302 of the UI screen. Variable regions 303 and 304 in the document area 302 are portions where input text data or image data to be inserted can change. Data to be inserted into such a variable region is referred to as variable data. In the variable region, actual data (such as an image or text) obtained from the database server 106 does not appear on the editing screen. Instead, only the position of the region into which the data will be inserted is displayed to a user. On the contrary, since the same objects are always inserted into fixed regions 305 and 306, respectively, the regions are displayed on the editing screen by disposing actual data (such as an image or text).

The VDP application is particularly different from a general desktop publishing (DTP) application in that there is a variable region. Moreover, unique information is assigned to a variable region, so that an object (such as image data) is inserted according to data stored in a database. Unique information is usually a condition that indicates a relationship between an object attribute (such as text, an image or graphics) and a database. For example, if the variable region 304 is to include an image whose file name is listed in a column "image file name" in a database, the condition is information that indicates such an image is to be included in the variable region 304. FIG. 3 illustrates an example of a case where an actual image is inserted into the variable region 304.

Figure 4:
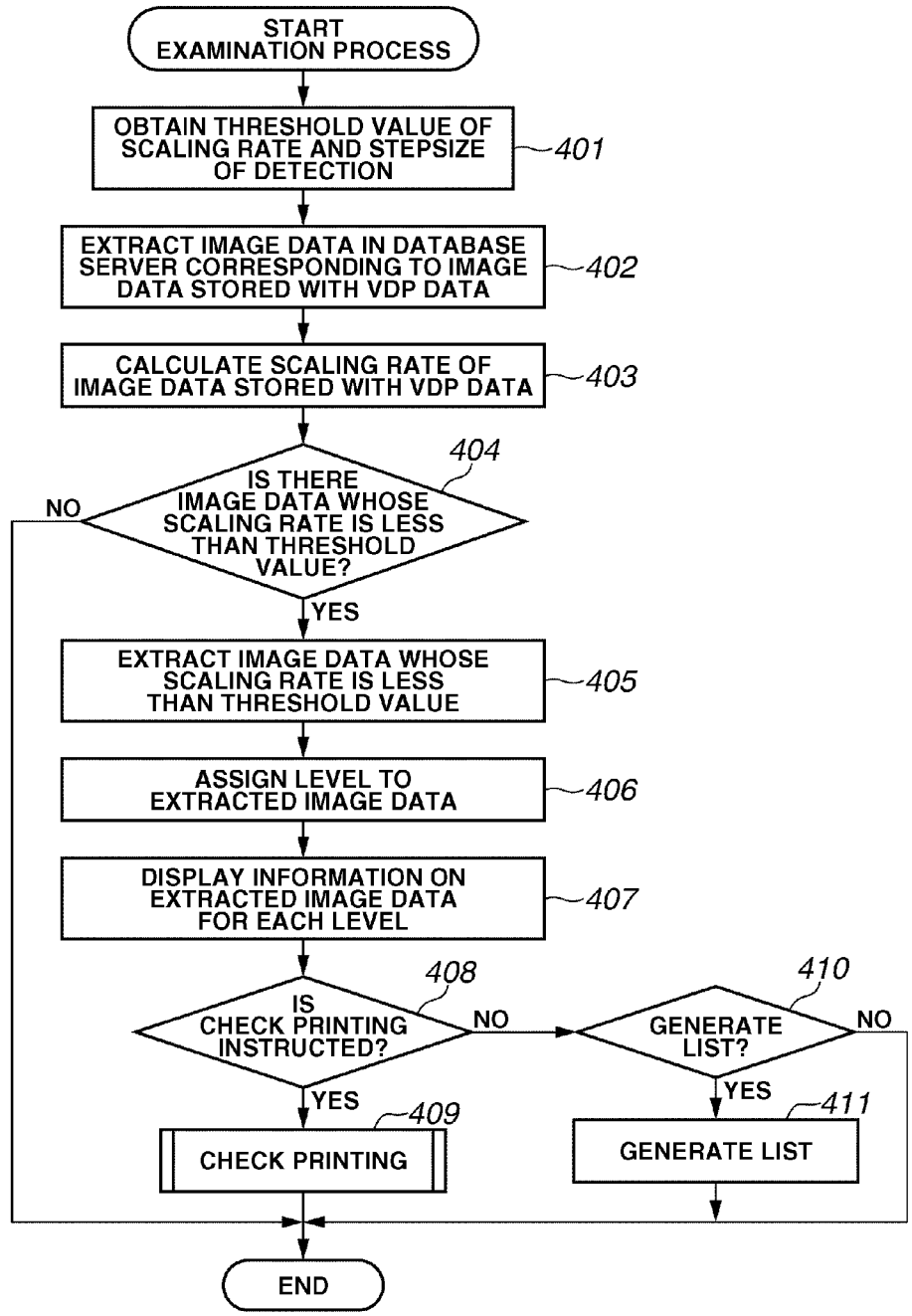
FIG. 4 is a flowchart based on a program for realizing a VDP data examination process according to an exemplary embodiment of the present invention.

A VDP data examination process which is performed by the VDP data examination unit 1605 in step 205 of the flowchart illustrated in FIG. 2 will be described below. FIG. 4 illustrates a flowchart based on a program for realizing a VDP data examination process according to an exemplary embodiment of the present invention.

Figure 5:
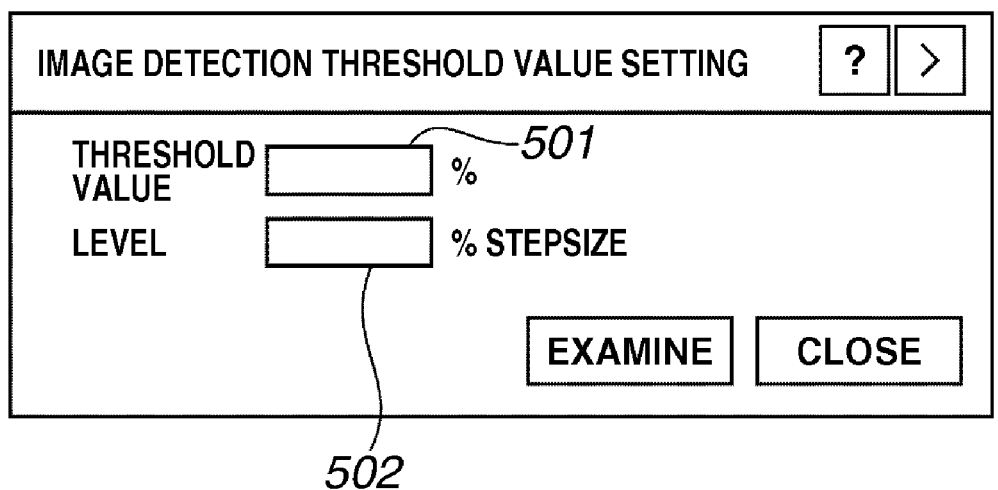
FIG. 5 illustrates an image detection threshold value setting panel for setting a threshold value and a value of stepsize according to an exemplary embodiment of the present invention.

In step 401, the VDP data examination unit 1605 obtains an initial threshold value of a scaling rate and a detection stepsize that are set by a user on a display screen illustrated in FIG. 5 (to be described below). A scaling rate is a proportion of a change in pixel size from image data stored in the database server 106 to image data stored together with VDP data in the file server 107. That is, (scaling rate)=(pixel size of image data stored in the database server 106)/(pixel size of image data at the time of printing that is converted in generating VDP data).

When the scaling rate is 1, the original image data is directly printed without enlargement or reduction. The scaling rate decreases if a pixel size of the original image data is small when a pixel size of image data requested in printing increases. In such a case, a print quality of a print output may be degraded to a level that is unacceptable to a user. The threshold value of a scaling rate and the detection stepsize will be described below.

In step 402, the VDP data examination unit 1605 searches and extracts image data that is stored together with the VDP data from the database server 106. In step 403, the VDP data examination unit 1605 calculates a scaling rate between the image data stored together with the VDP data and the corresponding image data stored in the database server 106.

In step 404, the VDP data examination unit 1605 determines whether there is image data whose scaling rate is less than the threshold value obtained in step 401. If there is image data whose scaling rate is less than the threshold value (YES in step 404), the process proceeds to step 405. If there is no image data whose scaling rate is less than the threshold value (NO in step 404), the process then ends.

Figure 6:
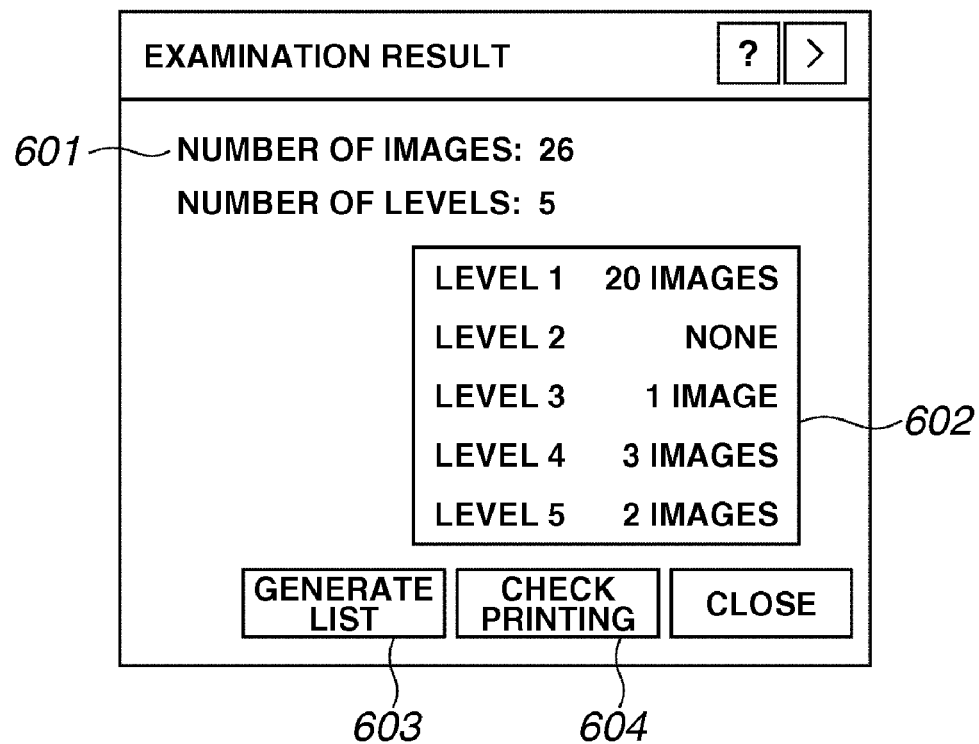
FIG. 6 illustrates an examination result display screen according to an exemplary embodiment of the present invention

In step 405, the VDP examining unit 1605 compares the threshold value set in step 401 with the scaling rate calculated in step 403, and searches and extracts the image data stored together with VDP data whose scaling rate is less than the threshold value set in step 401. In step 406, the VDP examination unit 1605 assigns a level to the image data extracted in step 405, based on the detection stepsize obtained in step 401. In step 407, the VDP data examination unit 1605 then instructs displaying a screen (a UI) of an examination result as illustrated in FIG. 6. In an "examination result display" screen illustrated in FIG. 6, "number of images" 601 indicates a total number of image data extracted in step 405. Numbers of image data that belong to each level according to the detection stepsize obtained in step 401 are displayed in an area 602. A user can press a "list generation" button 603 or a "check printing" button 604 on the UI screen using a mouse to instruct a list generation process or a check printing process to be described later.

In step 408, the VDP data examination unit 1605 determines whether there is an instruction to check-print image data whose scaling rate is less than the threshold value. If check printing is instructed (YES in step 408), the process proceeds to step 409, in which the VDP data examination unit 1605 check-prints the image data. Check printing will be described in detail below.

On the other hand, if check printing is not instructed (NO in step 408), the process proceeds to step 410. In step 410, the VDP data examination unit 1605 determines whether there is an instruction to generate a list of image data whose scaling rate is less than the threshold value. If it is determined that the list generation is instructed (YES in step 410), the process proceeds to step 411, in which the VDP data examination unit 1605 outputs the list. If it is determined that a list generation is not instructed (NO in step 410), the examining process ends.

The threshold value and the detection stepsize that are set in step 401 will be described below. FIG. 5 illustrates a screen for making an "image detection threshold value setting". A user sets a threshold value as a minimum required scaling rate of image data for maintaining print quality when printing variable data. Further, a user sets a detection stepsize as a range for assigning a level to image data stored together with VDP data, whose scaling rate is determined to be less than the threshold value. In the image detection threshold value setting screen illustrated in FIG. 5, a user can set a threshold value of 0 to 100% in a threshold value box 501 and a stepsize value of 0 to 100% in a stepsize value box 502. The stepsize value is required to be less than or equal to the threshold value.

For example, suppose that a pixel size of image data stored in the database server 106 that will be used in printing is (100, 100) pixels, and a user sets a threshold value as 50% and a stepsize for sorting image data into levels as 10%. In such a case, if a VDP application converts the image data to a pixel size of (400, 400) pixels when printing the image data, the scaling rate of the pixel size is 6.25%.

In the above-described example, image data is sorted into levels 1 to 5 based on the scaling rate of the pixel size. The five levels are categorized in units of 10% from 0% to 50%, for example, 0% to 10% into level 5, and 11% to 20% into level 4. The difference between the image data and the print data is greater (i.e., of lower image quality) for image data belonging to a higher level. In the above-described example, image data whose scaling rate is 6.25% is set at level 5.

A check printing process that is performed in step 409 in the flowchart illustrated in FIG. 4 will be described in detail below.

Check printing in the present exemplary embodiment refers to printing for enabling visual inspection of image data obtained from a database in a condition in which the image data is scaled for insertion into the actual form data. By check-printing such image data, a user is given an opportunity to confirm the image quality of the image data to be obtained when the image data is actually printed.

Figure 7:
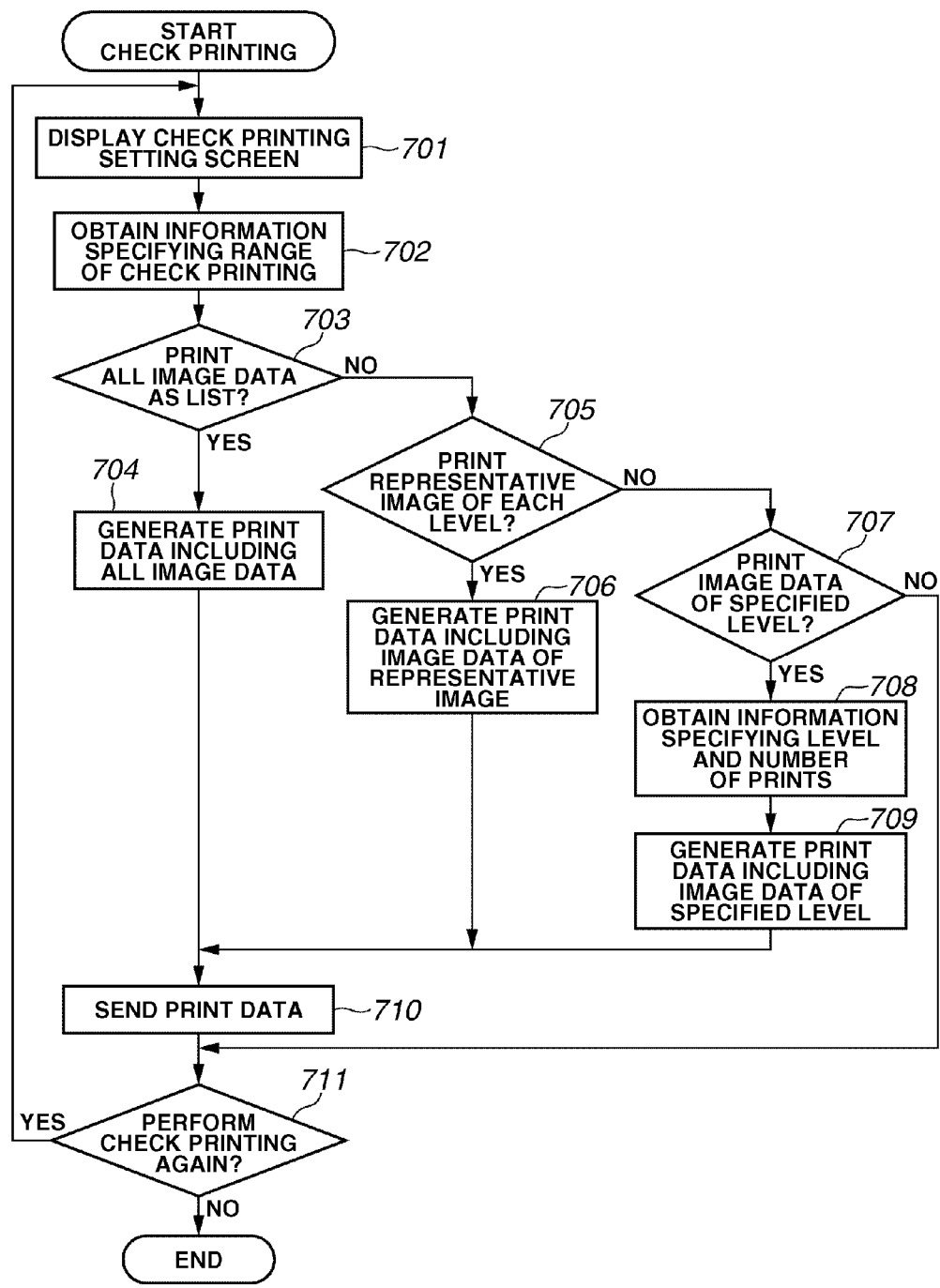
FIG. 7 is a flowchart based on a program for realizing a check printing process according to an exemplary embodiment of the present invention.
Figure 8:
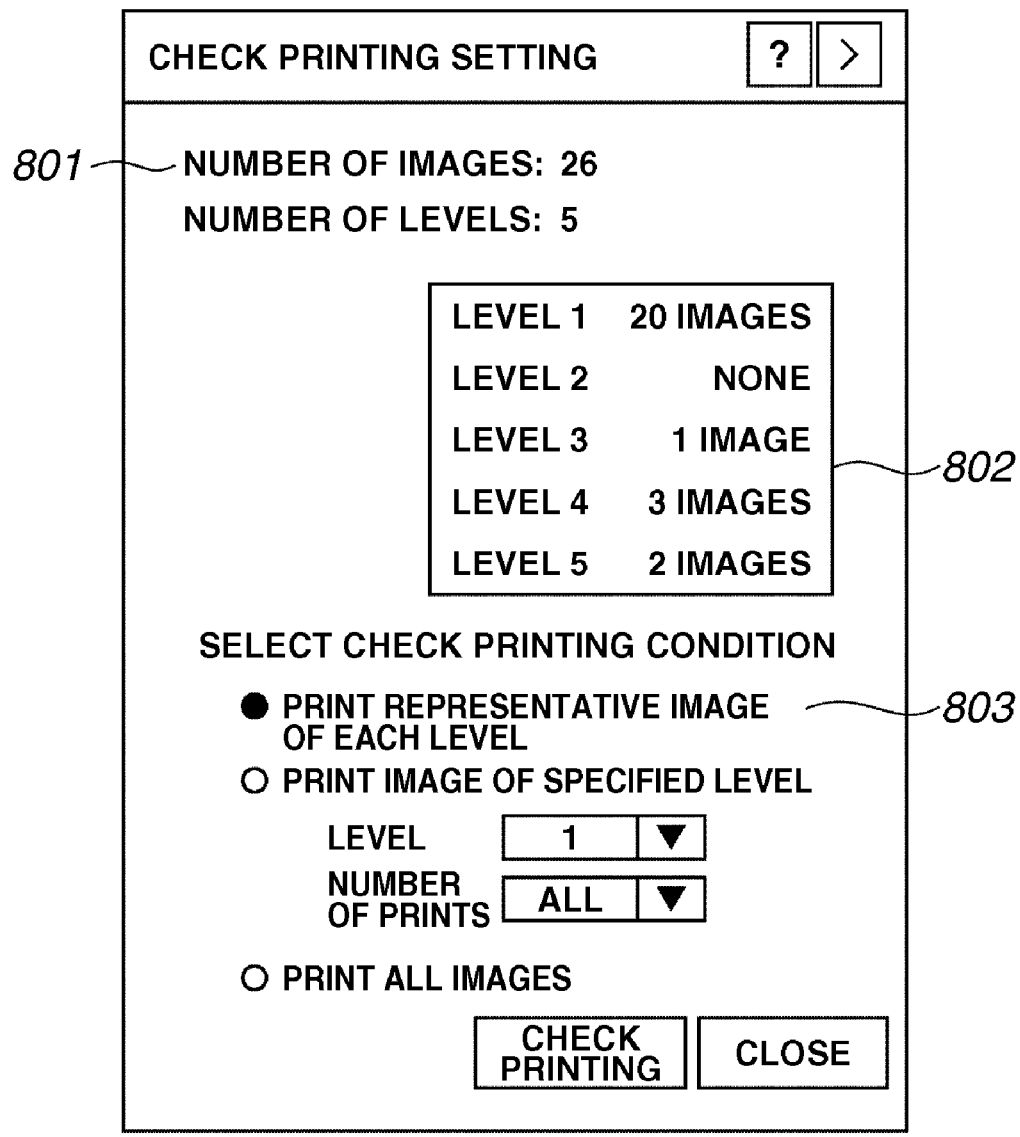
FIG. 8 illustrates an example of a check printing setting panel for confirming a total number of image data to be check-printed and a total number of image data of each level according to an exemplary embodiment of the present invention.

FIG. 7 illustrates a flowchart based on a program for realizing a check printing process. Further, FIG. 8 illustrates an example of a check printing setting screen, which is provided to a user for changing a setting when check-printing image data. In step 701, upon detecting that a user instructed check printing by pressing the "check printing" button 604 in the examination result display screen illustrated in FIG. 6, the VDP data examination unit 1605 displays the check printing setting screen illustrated in FIG. 8. A user can confirm a total number of image data 801 to be check-printed and a total number of image data in each level indicated in an area 802 on the UI screen illustrated in FIG. 8.

In step 702, the VDP data examination unit 1605 obtains information on the range of image data to be check-printed that is specified by a user.

In step 703, the VDP data examination unit 1605 determines whether the information obtained in step 702 indicates "print all images" of image data whose scaling rate is less than the threshold value set by the user. If the information indicates "print all images" (YES in step 703), the process proceeds to step 704. In step 704, the VDP data examination unit 1605 generates print data for printing out a list of all image data whose scaling rate is less than the threshold value set by the user. On the other hand, if the information does not indicate "print all images" (NO in step 703), the process proceeds to step 705.

In step 705, the VDP data examination unit 1605 determines whether the information obtained in step 702 indicates "print representative image of each level". If the information indicates "print representative image of each level" (YES in step 705), the process proceeds to step 706. In step 706, the VDP data examination unit 1605 generates print data for printing out a list of representative images of respective levels. A method of selecting a representative image will be described below. If the information does not indicate "print representative image of each level" (NO in step 705), the process proceeds to step 707.

In step 707, the VDP data examination unit 1605 determines whether the information obtained in step 702 indicates "print image of specified level". If the information indicates "print image of specified level" (YES in step 707), the process proceeds to step 708. In step 708, the VDP data examination unit 1605 obtains information on a specified level and a number of prints that are included in the information obtained in step 702. The information on a specified level and a number of prints is information based on the level to be check-printed and the number of images to be printed in the specified level that are specified by the user via the check printing setting screen illustrated in FIG. 8. As a result, the specified number of image data within a specified level is printed as a list. In step 709, the VDP data examination unit 1605 generates print data including the specified image data. On the other hand, if the information does not indicate "print image of specified level" (NO in step 707), the VDP data examination unit 1605 determines that check printing is cancelled and ends the check printing process.

In step 710, the VDP data examination unit 1605 sends the print data generated in step 704, 706, or 709 to the print server 114, so that the print data is printed out by the printer 116 for check printing.

In step 711, the VDP data examination unit 1605 then displays a UI screen (not illustrated) for a user to confirm whether to further perform check printing. If the VDP data examination unit 1605 detects that the user instructs further check printing (YES in step 711), the process returns to step 701. On the other hand, if the VDP data examination unit 1605 does not detect that a user instructs further check printing (NO in step 711), the process proceeds to step 206 in the flowchart illustrated in FIG. 2.

In step 206, the VDP data examination unit 1605 studies the print quality of the check-printed image data and checks whether the print quality matches the print quality desired by the user. If the print quality matches the print quality desired by the user (YES in step 206), the check printing of the VDP data is ended. If the print quality is inappropriate (NO in step 206), a printing condition can be changed to print the VDP data. As a result, a user can check a print quality of image data by performing a minimum required printing of the image data.

The "check printing setting" screen illustrated in FIG. 8 can be kept open until a user instructs "close", so that the user can continue to specify a different level and perform further check printing. Furthermore, a user can select "print all images" after printing each level separately.

In the "check printing setting" screen illustrated in FIG. 8, a user can specify a range of image data to be printed, which corresponds to information that the VDP data examination unit 1605 obtains in step 702, by selecting a print condition from a "select check printing condition" area 803. For example, if the "number of images" 801, which indicates the number of images whose scaling rate is less than the threshold value set by the user, is a number of images that a user can visually check, the user can select "print all images" from among the check printing conditions. As a result, all image data whose scaling rate is less than the threshold value set by the user is printed as a list. The user can then confirm the print quality of the output result of the image data.

On the other hand, a user can select "print representative image of each level" from among the check print conditions to print a representative image that is automatically selected from each level. The user can then confirm the image quality of the representative image. A representative image is an image whose scaling rate is smallest in each level (i.e., an image assumed to be of a low quality). Consequently, a representative image provides a user with a measure of image quality that should be guaranteed in each level. Alternatively, if an image whose scaling rate is largest is selected as a representative image, a list of images for confirming an image of highest image quality in each level can be provided to a user. Therefore, a representative image can be selected according to the actual environment.

Moreover, a user can select "print image of specified level" among the check print conditions, so that image data within the specified level can be check-printed as a list. The user can then confirm the quality of an image of the specified level.

Figure 9:
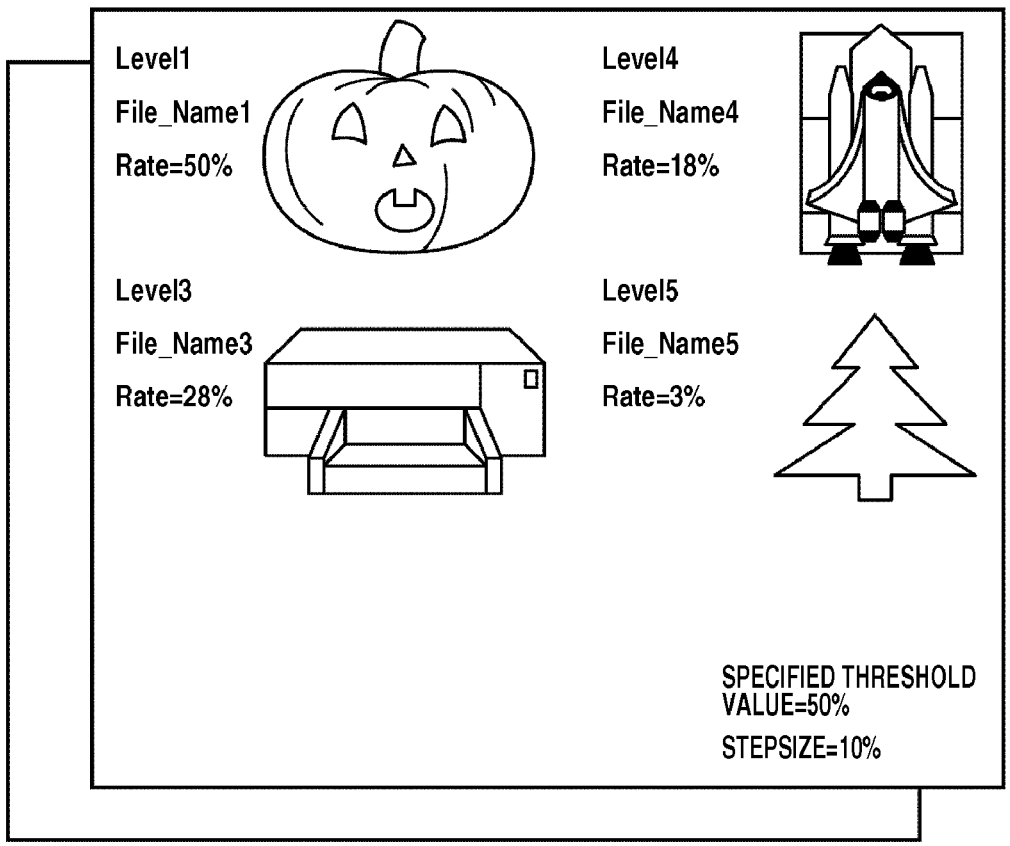
FIG. 9 illustrates a result of check-printing representative images of respective levels as a list, which is an example of a check printing result, according to an exemplary embodiment of the present invention.

FIG. 9 illustrates an example of a check printing result in a case where a list of representative images of each level is check-printed.

The printer 116 prints a list of image data used in VDP data, in which the size of the image data is the size to be obtained when the image data is printed after the image data is converted by the VDP application. The level that is set by a threshold value and a detection stepsize specified by a user, a file name, scaling rate information, and image data are printed in the check printing result. The user views the print quality of an image that has been check-printed, searches for an image whose print quality is acceptable, and confirms the scaling rate of the acceptable image. A user can further confirm the print quality in detail by setting the above-described scaling rate of an acceptable image as a threshold value of the next check printing and repeating check printing.

In a case where all image data is to be check-printed, the printer 116 prints the image data in a list at a size to be obtained when printing the image data after the image data is converted by the VDP application. A level that is set by a threshold value and a detection stepsize specified by a user, file name, a threshold value, scaling rate information, and image data are printed in the check printing result. As a result, a user can check the quality of all image data in detail. Further, the actual output result can be provided to a user as reference information for setting a threshold value when repeating check printing, which is useful for the user.

In a case where image data of a specified level is to be printed, the printer 116 prints images in a list at a size to be obtained when printing the image data after the image data is converted by the VDP application.

If a user views a check print result and finds that the print quality is unacceptable, the user lists up images whose scaling rate is less than the threshold value (i.e., images of low quality). The user can use the check printing process to edit image data, such as modifying and deleting the image data, to update and perform maintenance of the database server 106.

A user can initially set a threshold value as an arbitrary value, and then can obtain a value which is appropriate as a threshold value from the check printing result. Furthermore, the appropriate threshold value required in performing variable data printing can be obtained by repeating the above-described process. If a printer performs the same variable data printing, a user can set an appropriate threshold value from the start by storing the threshold value of the previous variable data printing. As a result, the maintenance of image data in a database server can be managed at a certain level. Moreover, if a user repeats the processes of setting a threshold value, check printing, and confirming a check printing result, the user can determine whether the relationship between the print quality and the threshold value of variable data printing is appropriate.

Figure 10:
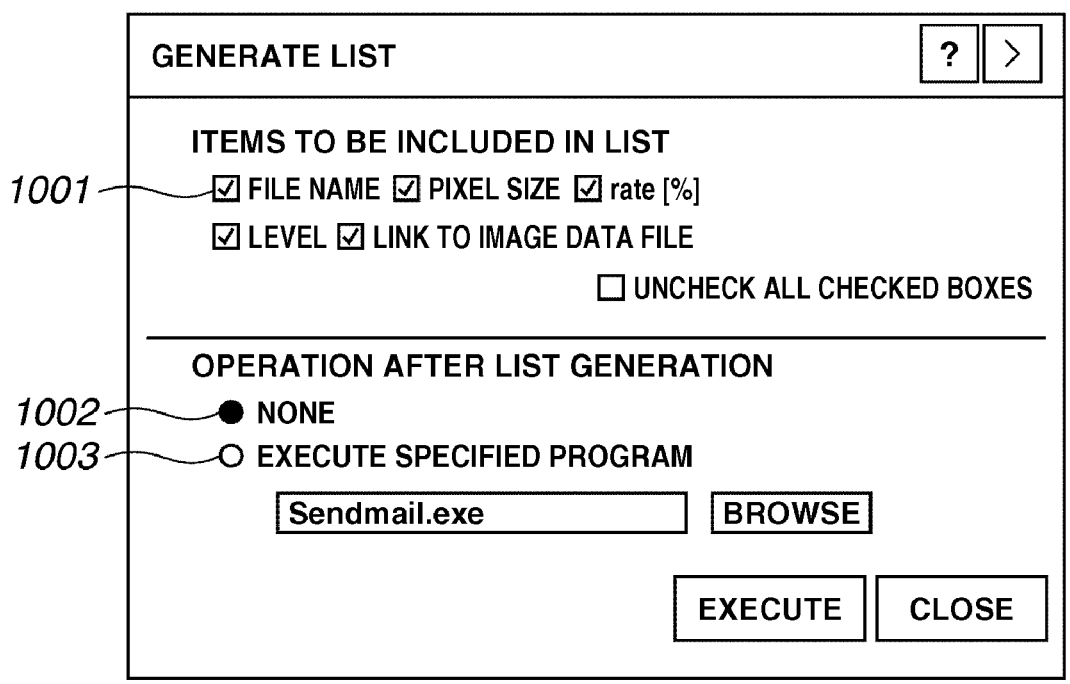
FIG. 10 is an example of a list generation window (UI screen) which is activated when a user selects list generation on a examination result display panel illustrated in FIG. 6 according to an exemplary embodiment of the present invention.

FIG. 10 illustrates an example of a list generation window (UI screen), which is activated when a user selects the list generation button 603 in the examination result display screen illustrated in FIG. 6. By using the list generation window, a user can make a setting to store (in an external file) a list of image data whose scaling rate is less than a threshold value set by the user in step 401 of the flowchart illustrated in FIG. 4.

In the list generation window illustrated in FIG. 10, a user selects items to be included in the list by checking the check boxes 1001 in the upper portion of the window. All of the items are previously checked as a default, so that "an ID or a file name identifying an image", "image pixel size", "(scaling) rate[%]", and "link to image data" are included in the list to be generated. A list that is actually output additionally includes a "threshold value when generating a list" and "detection stepsize" that are set by the user.

In the lower portion of the window illustrated in FIG. 10, a user can select an operation to be performed after generating a list. If a user executes the "None" button 1002, which is a default item, a screen is displayed to inquire of the user about a storage folder name and a name of the list. If a user specifies a storage folder name and a name of the list and stores the list, a list is generated in the folder specified by the user. The list can be stored as a file in a format, such as XML, and the image data can be linked to the XML file by copying the actual image data onto the same folder.

FIG. 11 illustrates content of an XML file when a list of image data is stored in XML format. The XML file can generate a list as illustrated in FIG. 12 by using an XSLT. XSLT is a processor that converts an XML document into an HTML format document by using an XSL document. The list is not limited to be stored in XML format, and the list can be generated by a spreadsheet software application and be stored, or the list can be stored in a simple text file format.

In the list generation window illustrated in FIG. 10, if a user selects "execute specified program" radio button 1003 as an operation after generating the list, the generated list is not displayed. Instead, the specified program sends the generated list by e-mail or stores the list.

Figure 13:
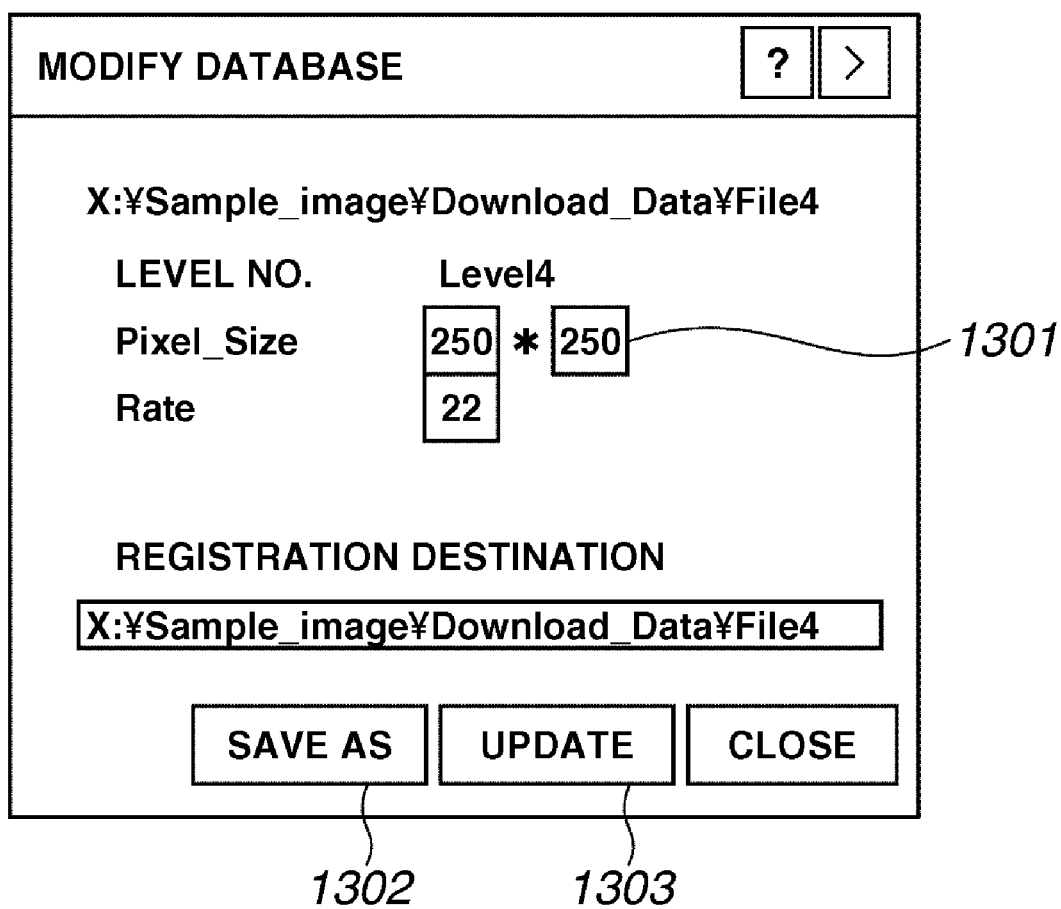
FIG. 13 illustrates an example of a screen for setting a database modification application, which is called up by clicking a link name of a file in FIG. 12, according to an exemplary embodiment of the present invention.

Referring to the generated list illustrated in FIG. 12, if a user desires to modify the database server 106, the user clicks a link to a file to be modified in a "Link" column. Consequently, an application for modifying a database is called up using an XSLT associated with the XML file. FIG. 13 illustrates an example of a screen for setting a database modification application called up by a user clicking a link name of a file in the list illustrated in FIG. 12.

A database modification application includes at least the VDP data modification unit 1606. The database modification application displays in the setting screen illustrated in FIG. 13 a scaling rate and an initial value of the pixel size of image data in the database server 106 to be modified. A user can then freely set values of a pixel size and scaling rate of image data in boxes 1301. After modifying the values, the user clicks a "save as" button 1302 or an "update" button 1303. As a result, the user can save an image and a recommended scaling rate as image data in the database server 106, or update the image data and the recommended scaling rate in the database.

Figure 14:
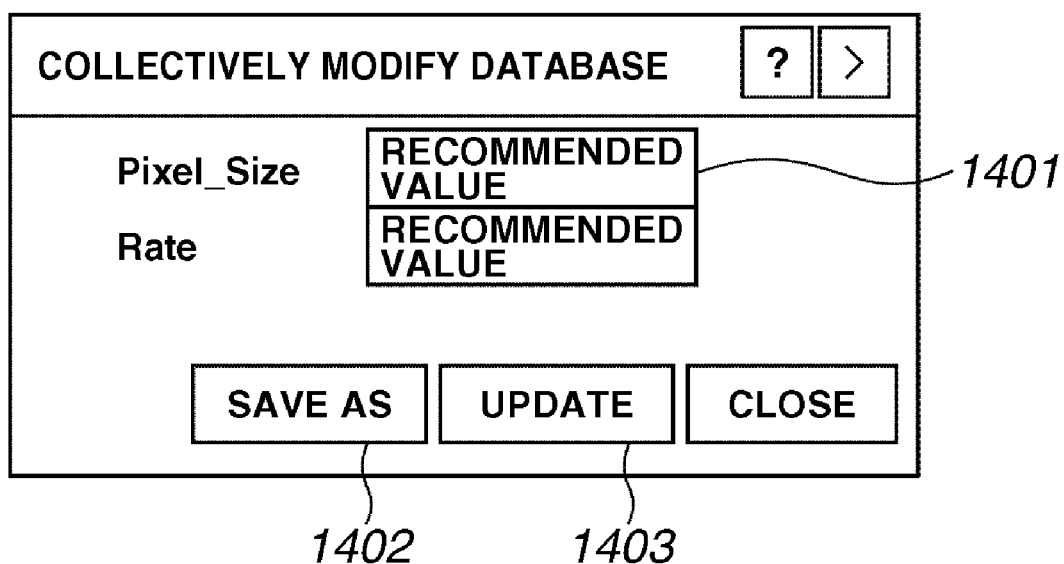
FIG. 14 illustrates an example of a screen for setting an application that can collectively modify images in a database according to an exemplary embodiment of the present invention.

Furthermore, a user can call up an application that can perform collective modification of images in a database. In a "collectively modify database" display screen illustrated in FIG. 14, a user can input by inputting values in boxes 1401. The user can save (by clicking a "save as" button 1402) or update (by clicking an "update" button 1403) a recommended pixel size and a recommended scaling rate for all image data. If the recommended pixel size and recommended scaling rate are different for respective images, an image can be selected by checking a check box or by a pull-down button (not illustrated), so that only the selected image is stored or updated at the recommended pixel size and recommended scaling rate.

Setting recommended information of a scaling rate or a pixel size to image data as described above is useful in the next printing of variable data. If a user check-prints an image that a user wants to use, and the image is greatly degraded when inserted into a variable region, the user can re-edit the form data. However, if the form data is modified, it is necessary to perform check printing again to confirm how the image data will be printed when the image data is inserted into the modified form data. Therefore, variable printing can be performed at an appropriate print quality by setting recommended information, such as scaling rate information, on the image data, and printing the image by inserting the image data according to the recommended information. Such a variable printing uses image data that does not match the size of the variable region when inserted into the region.

The VDP data modification process in step 207 of the flowchart illustrated in FIG. 2 will be described below. If a user determines that it is necessary to modify image data as a result of confirming the print quality by check-printing the image data, the user can modify the image data in the database server 106. Furthermore, a user can use the list generated in step 411 of the flowchart illustrated in FIG. 4 to determine whether to modify the image data or modify the pixel size. Upon receiving a user instruction to modify image data, the VDP data modification unit 1606 searches the image data that a user desires to edit in the database server 106. A user can specify a level, an image ID or a file name, or a scaling rate to specify image data. The VDP data modification unit 1606 obtains the specified image data from the database server 106 and supplies the image data to the user by displaying on a screen. The user can replace the obtained image data, re-register the obtained image data after performing image processing, or delete the obtained image data.

Other Exemplary Embodiments

The present invention can be applied to a system including a plurality of devices or to an apparatus of a single device. Examples of such a system and an apparatus are a printer, a facsimile, a PC, and a computer system including a server and a client.

The present invention can also be achieved by providing a storage medium, which stores software (program code) for realizing the operations of the above-described exemplary embodiments, to a system or an apparatus. The program code stored in the storage medium can be read and executed by a computer (central processing unit (CPU) or micro-processing unit (MPU)) of the system or the apparatus.

In this case, the software (program code) itself realizes the operations of the embodiments. The software (program code) itself and the storage medium, which stores the software (program code), constitute the present invention.

Such software (program code) can take any form, for example, object code, a program executed by an interpreter, or script data supplied to an OS.

The storage medium can be, for example, a floppy disk, a hard disk, an optical disk, a magneto-optical disk, a compact disc-read-only memory (CD-ROM), a CD-recordable (CD-R), a CD-rewritable (CD-RW), a digital versatile disc (DVD), a DVD-ROM, a magnetic tape, a nonvolatile memory card, or a ROM.

Such software (program code) can also be supplied by the system or the apparatus accessing a web page on the Internet through the browser of a client computer. The software (program code) itself or a compressed file including an auto-install function can be downloaded from the web page onto a hard disk. In addition, the program code can be broken up into a plurality of files, and each file can be downloaded from different web pages. Namely, the present invention can be applied to a World Wide Web (WWW) server that allow numerous users to download the program files so that the functions or processes of the present invention can be realized on their computers.

Furthermore, such software (program code) can be encrypted and stored in a storage medium, such as a CD-ROM, to be distributed to users. A user who meets the determining conditions can download the key information for decrypting the program from a web page through the Internet. By using the key information, the encrypted program can be executed and installed in a computer to realize the functions of the present invention.

Furthermore, the above-described exemplary embodiments can be not only realized by executing software (program code) read by a CPU. An operating system (OS) or the like working on a computer can also perform a part or the whole of processes according to instructions of the software (program code) and realize functions of the above-described exemplary embodiments.

Furthermore, software (program code) read from a storage medium can be stored in a memory equipped in a function expansion board inserted in a computer or a function expansion unit connected to a computer, and a CPU in the function expansion board or the function expansion unit can execute all or part of the processing based on the instructions of the software (program code) to realize the functions of the above-described exemplary embodiments.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-049369 filed Feb. 28, 2007, which is hereby incorporated by reference herein in its entirety.

What is claimed is:

1. An information processing apparatus for generating print data for check-printing image data to be inserted into a variable region of form data in a printer, the apparatus comprising:
   an acquisition unit configured to acquire image data to be inserted into the variable region of the form data;
   a calculation unit configured to calculate a scaling rate between the image data acquired by the acquisition unit prior to being scaled for insertion into the variable region and corresponding image data that has been scaled for insertion into the variable region;
   a generation unit configured to determine image data to be check-printed based on the scaling rate calculated by the calculation unit and to generate print data for check-printing the image data to be check-printed in a condition in which the image data to be check-printed has been scaled for insertion into the variable region; and
   a sending unit configured to send the print data generated by the generation unit.

2. The apparatus according to claim 1, further comprising a setting unit configured to set a threshold value of a scaling rate for determining whether image data to be inserted into a variable region is to be check-printed,
   wherein the generation unit determines whether image data is to be check-printed based on the threshold value set by the setting unit.

3. The apparatus according to claim 2, wherein the setting unit sets a stepsize for sorting the image data into levels based on the scaling rate, and
   wherein the apparatus further comprises a display unit configured to display a number of images of image data to be check-printed from among the image data and a number of images of image data belonging to each level based on the threshold value and the stepsize set by the setting unit.

4. The apparatus according to claim 3, wherein the display unit provides a display to enable specifying a check printing condition, and
   wherein the generation unit generates the print data based on the check printing condition specified via the display unit.

5. The apparatus according to claim 4, wherein the check printing condition includes one or all of check-printing all image data determined based on the threshold value, check-printing a representative image of each level, and check-printing an image of a specified level.

6. The apparatus according to claim 1, further comprising an instruction unit configured to instruct modifying or deleting image data stored in a database based on an association between image data that has been scaled to be inserted into the variable region and original image data stored in the database according to a user instruction corresponding to a result of check-printing the print data generated by the generation unit.

7. The apparatus according to claim 1, further comprising a recommended information setting unit configured to set information on a recommended scaling rate to the image data,
   wherein the generation unit generates the print data in a condition in which the image data has been inserted into the variable region based on the recommended scaling rate set by the recommended information setting unit.

8. A method for generating print data for check-printing image data to be inserted into a variable region of form data in a printer, the method comprising:
- acquiring image data to be inserted into the variable region of the form data;
- calculating a scaling rate between the acquired image data prior to being scaled for insertion into the variable region and corresponding image data that has been scaled for insertion into the variable region;
- determining image data to be check-printed based on the scaling rate;
- generating print data for check-printing the image data to be check-printed in a condition in which the image data to be check-printed has been scaled for insertion into the variable region; and
- sending the print data.

9. The method according to claim 8, further comprising:
- setting a threshold value of a scaling rate for determining whether image data to be inserted into a variable region is to be check-printed; and
- determining whether image data is to be check-printed based on the threshold value.

10. The method according to claim 9, further comprising:
- setting a stepsize for sorting the image data into levels based on the scaling rate; and
- displaying a number of images of image data to be check-printed in the image data and a number of images of image data belonging to each level based on the threshold value and the stepsize.

11. The method according to claim 10, further comprising:
- providing a display to enable specifying a check printing condition; and
- generating the print data based on the check printing condition.

12. The method according to claim 11, wherein the check printing condition includes one or all of check-printing all image data determined based on the threshold value, check-printing a representative image of each level, and check-printing an image of a specified level.

13. The method according to claim 8, further comprising instructing modifying or deleting image data stored in a database based on an association between image data that has been scaled to be inserted into the variable region and original image data stored in the database according to a user instruction corresponding to a result of check-printing the print data.

14. The method according to claim 8, further comprising:
- setting information on a recommended scaling rate to the image data; and
- generating the print data in a condition in which the image data has been inserted into the variable region based on the recommended scaling rate.

15. A non-transitory computer-readable storage medium storing instructions, which when executed by an apparatus, cause the apparatus to perform operations comprising:
- acquiring image data to be inserted into a variable region of form data;
- calculating a scaling rate between the acquired image data prior to being scaled for insertion into the variable region and corresponding image data that has been scaled for insertion into the variable region;
- determining image data to be check-printed based on the scaling rate;
- generating print data for check-printing the image data to be check-printed in a condition in which the image data to be check-printed has been scaled for insertion into the variable region; and
- sending the print data.

16. An information processing apparatus for generating print data for check-printing image data to be inserted into a variable region of form data in a printer, the apparatus comprising:
- an acquisition unit configured to acquire image data to be inserted into the variable region of the form data;
- a calculation unit configured to calculate a scaling rate between the image data acquired by the acquisition unit prior to being scaled for insertion into the variable region and corresponding image data that has been scaled for insertion into the variable region;
- a generation unit configured to generate print data for check-printing image data that has been scaled for insertion into the variable region and a scaling rate for each corresponding image data; and
- a sending unit configured to send the print data generated by the generation unit.

17. A method for generating print data for check-printing image data to be inserted into a variable region of form data in a printer, the method comprising:
- acquiring image data to be inserted into the variable region of the form data;
- calculating a scaling rate between the image data acquired prior to being scaled for insertion into the variable region and corresponding image data that has been scaled for insertion into the variable region;
- generating print data for check-printing image data that has been scaled for insertion into the variable region and a scaling rate for each corresponding image data; and
- sending the generated print data.

18. A printing system comprising:
- a generation unit configured to generate form data including a variable region;
- a acquisition unit configured to acquire image data to be inserted into the variable region from a database;
- a calculation unit configured to calculate a scaling rate between the image data acquired by the acquisition unit prior to being scaled for insertion into the variable region and corresponding image data that has been scaled for insertion into the variable region; and
- a printing unit configured to determine image data to be check-printed based on the scaling rate calculated by the calculation unit and to check-print the image data to be check-printed in a condition in which the image data to be check-printed has been scaled for insertion into the variable region.

19. A method comprising:
- generating form data including a variable region;
- acquiring image data to be inserted into the variable region from a database;
- calculating a scaling rate between the image data acquired prior to being scaled for insertion into the variable region and corresponding image data that has been scaled for insertion into the variable region;
- determining image data to be check-printed based on the calculated scaling rate; and
- check-printing the image data to be check-printed in a condition in which the image data to be check-printed has been scaled for insertion into the variable region.

* * * * *